(No Model.)

N. EVINGER.
CHURN.

No. 445,883.  Patented Feb. 3, 1891.

WITNESSES:
F. L. Ourand.
W. D. Coombs

INVENTOR:
Noah Evinger,
by Sauis Bagger & Co.,
Attorneys.

UNITED STATES PATENT OFFICE.

NOAH EVINGER, OF TERRE HAUTE, INDIANA, ASSIGNOR OF ONE-HALF TO CHARLES WOOD, OF SAME PLACE.

CHURN.

SPECIFICATION forming part of Letters Patent No. 445,883, dated February 3, 1891.

Application filed September 8, 1890. Serial No. 364,348. (No model.)

*To all whom it may concern:*

Be it known that I, NOAH EVINGER, a citizen of the United States, and a resident of Terre Haute, in the county of Vigo and State of Indiana, have invented certain new and useful Improvements in Churns; and I do hereby declare that the following is a full, clear, and exact description of the invention, which will enable others skilled in the art to which it appertains to make and use the same, reference being had to the accompanying drawings, which form a part of this specification.

My invention relates to improvements in churns of that class known as "rotary churns."

I have found by experience that in churning butter much better results can be reached if the dashers are located near the surface of the cream. I have also found that when the dashers are so located some means must be provided for keeping up a circulation of the cream in the churn, as otherwise the cream near the bottom would not be acted upon by the dashers.

The object of my invention is to provide simple and efficient means whereby the churn-dasher will adjust itself to the quantity of cream in the churn, and to provide means for keeping up a constant circulation or agitation of the cream, so that it will be thoroughly subjected to the action of the dashers.

The invention consists in the novel construction and combination of parts, hereinafter fully described, and specifically pointed out in the claims.

Figure 1:
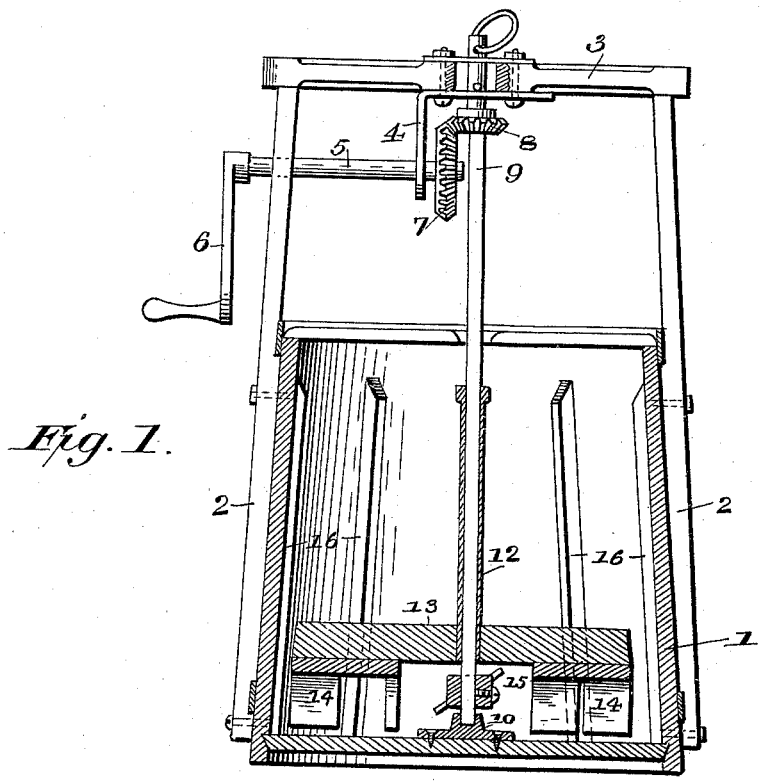
Figure 2:
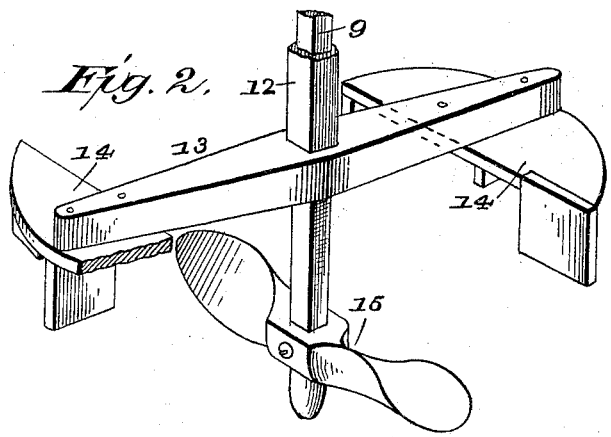

In the accompanying drawings, Figure 1 is a central sectional view of a churn constructed in accordance with my invention. Fig. 2 is a detail perspective view of the agitating-plate.

In the said drawings the reference-numeral 1 designates the tub or vessel for containing the cream.

2 designates two uprights secured to the tub and projecting some distance above the top thereof, where they are connected by the cross-piece 3, from which depends a bracket 4, which forms one of the bearings for the shaft 5, the other bearing being in one of the arms 2. This shaft 5 is provided at its outer end with an operating-crank 6, and at its inner end carries a bevel gear-wheel 7, which meshes with a bevel-pinion 8, secured to the angular shaft 9, the upper end of which passes through an opening in the cross-plate 3, while its lower end is stepped in a block 10, secured to the bottom of the tub or vessel 1.

The numeral 12 designates a sleeve embracing and corresponding in shape with the shaft 9. This sleeve is vertically movable upon said shaft and carries at its lower end a plate 13, from the ends of which depend the dashers 14. This plate also acts as a butter-gatherer.

At or near the lower end of shaft 9 is secured an agitating-plate 15, each end of which is provided with curved recesses arranged oppositely to each other, so that as said plate is rotated the cream will be kept in a constant state of agitation.

The numeral 16 designates a series of vertical breakers secured to the interior of the tub.

The operation will be readily understood. The requisite amount of cream being placed in the tub, the plate 13 will float upon the surface thereof with the dashers 14 depending a slight distance below. The shaft 9 now being rotated the cream will be rapidly broken up and the butter formed, the agitator-plate keeping the cream in circulation from top to bottom, whereby all the particles will be subjected to the action of the dashers. The breakers 16 act in conjunction with the dashers to break up the cream.

Having thus described my invention, what I claim is—

In a churn, the combination, with the tub or vessel 1, of the rotatable shaft 9, the sleeve 12, vertically movable upon said shaft, provided with a plate 13 and dashers 14, and the vertically-adjustable agitating-plate 15, secured to said shaft, substantially as described.

In testimony that I claim the foregoing as my own I have hereunto affixed my signature in presence of two witnesses.

NOAH EVINGER.

Witnesses:
CHARLES WOOD,
JAMES WOOD.